UNITED STATES PATENT OFFICE.

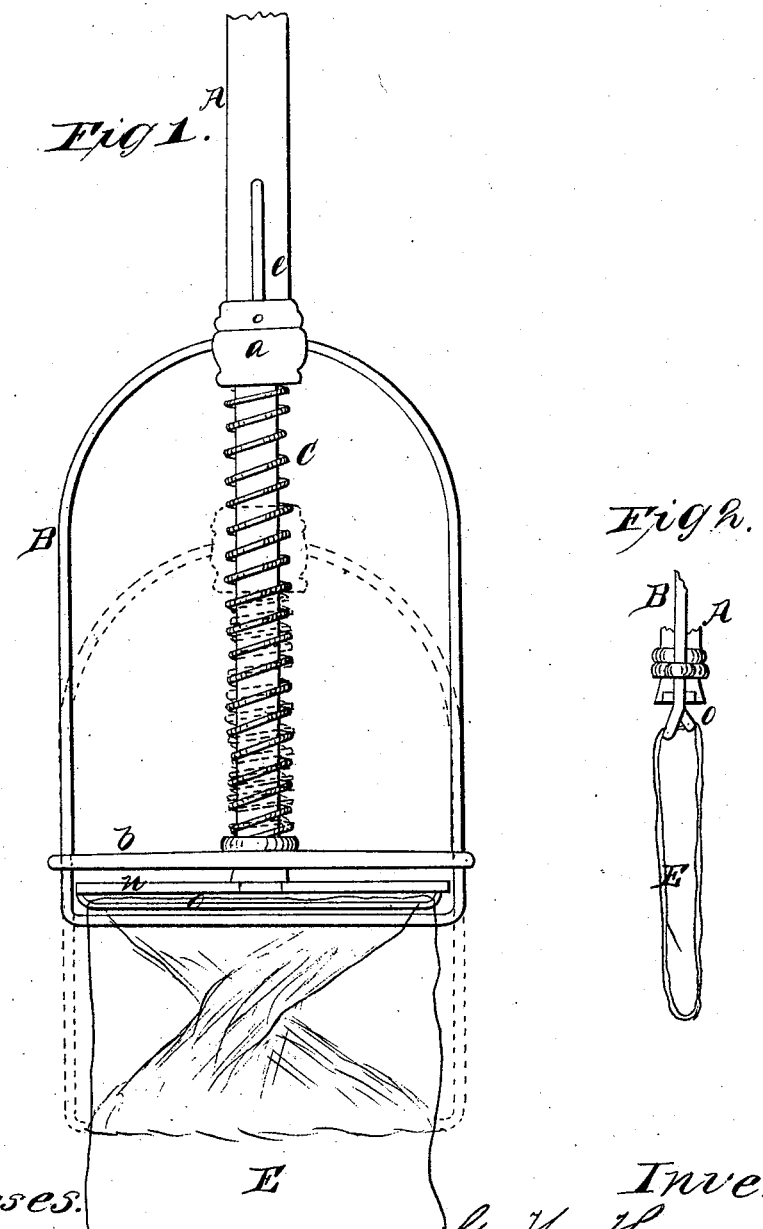

GEORGE H. HAMMER, OF NEWVILLE, PENNSYLVANIA.

IMPROVED MOP-HEAD.

Specification forming part of Letters Patent No. 54,146, dated April 24, 1866.

*To all whom it may concern:*

Be it known that I, GEORGE H. HAMMER, of Newville, in the county of Cumberland and State of Pennsylvania, have invented certain new and useful Improvements in Mop-Heads; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention relates to that class of mop-heads or frames which are denominated "self-wringing;" and it consists in the use of a spiral spring in connection with a sliding frame, as hereinafter described.

Figure 1 is a front view, and Fig. 2 an edge view of the same.

A represents the handle, the lower portion of which is made slightly smaller, and has its lower end passing loosely through a cross-head, $b$, below which is secured rigidly to the lower end of the handle another cross-bar, $n$, to which is secured a rod or wire, $o$, as shown in Fig. 1.

A frame constructed of wire or other suitable material is formed as represented by B, and which passes through the ends of the cross-head $b$, and has its upper ends secured to the sliding collar $a$, secured loosely upon the handle, as shown in Fig. 1. A spiral spring, C, is wound around the handle, as shown, one end being secured to the collar $a$, and its other end being fastened to the handle A, near the cross-bar $b$.

The lower portion of B is curved slightly to one side, and the loop or wire $o$ is curved in the opposite direction, as shown in Fig. 2, so that when in position they may lie side by side, and thus keep them parallel.

A spring-catch, $e$, may be secured to the handle and arranged to hold the frame B up by engaging with the collar $a$, though the spring C is intended to do this without the aid of the catch $e$.

The cloth E is inserted through the loop $o$ and frame B, and has its ends fastened together. To operate it the frame B is shoved down and the handle turned while the frame is held, thus wringing the cloth, as indicated in red. When released the spring C immediately unwinds the cloth and returns the frame instantly to its place.

Having thus described my invention, what I claim is—

The mop-head consisting of the frame B and cross-bars $b$ and $n$, in combination with the spring C, when said parts are arranged to operate as herein shown and described.

GEORGE H. HAMMER.

Witnesses:
W. C. DODGE,
P. T. DODGE.